United States Patent [19]

Focke et al.

[11] Patent Number: 5,074,400
[45] Date of Patent: Dec. 24, 1991

[54] PROCESS AND APPARATUS FOR CHANGING THE RELATIVE POSITION OF PACKS, ESPECIALLY OF CUBOIDAL CIGARETTE PACKS OF THE HINGE-LID TYPE

[75] Inventors: Heinz Focke, Verden; Henry Buse, Visselhövede, both of Fed. Rep. of Germany

[73] Assignee: Focke & Co. (GmbH & Co.), Verden, Fed. Rep. of Germany

[21] Appl. No.: 528,504

[22] Filed: May 25, 1990

[30] Foreign Application Priority Data

May 26, 1989 [DE] Fed. Rep. of Germany ....... 3917115

[51] Int. Cl.$^5$ ............................................. B65G 47/24
[52] U.S. Cl. ...................................... 198/415; 198/623
[58] Field of Search ...................... 198/415, 836.2, 623

[56] References Cited

U.S. PATENT DOCUMENTS

| | | | |
|---|---|---|---|
| 3,312,326 | 4/1967 | Huppenthal | 198/415 |
| 3,462,001 | 8/1969 | Boyce | 198/415 |
| 3,578,141 | 5/1971 | Sheehan | 198/415 |
| 3,602,358 | 8/1971 | Jakobsson | 198/415 X |
| 3,809,214 | 5/1974 | Reist | 198/415 X |
| 4,085,839 | 4/1978 | Crawford | 198/415 X |
| 4,164,996 | 8/1979 | Tomlinson | 198/415 |

FOREIGN PATENT DOCUMENTS

| | | |
|---|---|---|
| 1917533 | 10/1970 | Fed. Rep. of Germany . |
| 2510094 | 11/1975 | Fed. Rep. of Germany . |
| 2530886 | 5/1981 | Fed. Rep. of Germany . |
| 3016940 | 11/1981 | Fed. Rep. of Germany ...... 198/415 |
| 3422870 | 1/1985 | Fed. Rep. of Germany . |
| 2320235 | 3/1977 | France . |
| 2564423 | 11/1985 | France . |

*Primary Examiner*—Joseph E. Valenza
*Assistant Examiner*—Keith L. Dixon
*Attorney, Agent, or Firm*—Sughrue, Mion, Zinn, Macpeak & Seas

[57] ABSTRACT

Process and apparatus for changing the relative position of packs, especially of cuboidal cigarette packs of the hinge-lid type. Prior art processes and apparatuses work with forces having shock-like impacts on the packs, so that there is a risk of the packs getting damaged. The invention guarantees gentle changes of the relative position. Each pack is turned by way of being pulled by two conveyor belts running at different velocities and being arranged at two opposite regions of the pack.

22 Claims, 3 Drawing Sheets

PROCESS AND APPARATUS FOR CHANGING THE RELATIVE POSITION OF PACKS, ESPECIALLY OF CUBOIDAL CIGARETTE PACKS OF THE HINGE-LID TYPE

BACKGROUND OF THE INVENTION

The invention relates to a process changing the relative postition of packs, especially of cuboidal cigarette packs of the hinge-lid type, the packs being successively fed to a turning station.

SUMMARY OF THE INVENTION

In packaging machines, it is a common necessity to change the relative position of the packs For this process, the often delicate wrappings of the packs have to be taken into account. It is known in the art to discharge the packs transverse to the original moving direction. Herewith, the position relative to the conveying direction also changes. This abrupt change in direction effects an application of extremely high forces on the pack contents and the pack itself. With non-rigid packs having soft contents, the risk of packs getting damaged can not be ruled out. This applies even more so to cigarette packing machines, since they work at particularly high operating speeds. The present invention has the object to create a process and an apparatus, with which the relative position of the packs can be changed in a gentle way so the packs are treated with care.

BRIEF DESCRIPTION OF THE DRAWINGS

This object is attained according to the invention by a process, in which the packs are turned in the region of a turning station during transport by at least two separate conveying means (turning conveyors) which engage opposite sides of the packs and which are driven by different (pulling) velocities V4 and V5. The packs are not diverted from their original conveying direction, but are only turned in a gentle way. Especially cuboidal cigarette packs with rectangular cross-section can be oriented from a position transverse to the conveying direction to a position parallel to the conveying direction in a relatively gentle but nevertheless fast way.

DETAILED DESCRIPTION OF PREFERRED EMBODIMENTS

Further fundamental process features of the invention are disclosed in the (process) subclaims.

The object is further attained according to the invention by an apparatus comprising two separate conveying means (turning conveyors) in the region of the turning station which are drivable by different (pulling) velocities V4 and V5 and by means of which the packs are turnable by being pulled at opposite pack sides during transport. The conveying direction is not changed by the conveying means adjoining the feed track, so that a gentle turning movement of the individual packs is ensured.

Further fundamental apparatus features of the invention follow from the (apparatus) subclaims.

Both, the process and the apparatus according to the invention are not restricted to conveying and changing the relative position of exactly cuboidal packs, but can also handle packs of other designs like those having partially square cross-sections, cubic shape, rounded edges and the like.

Figure 1:
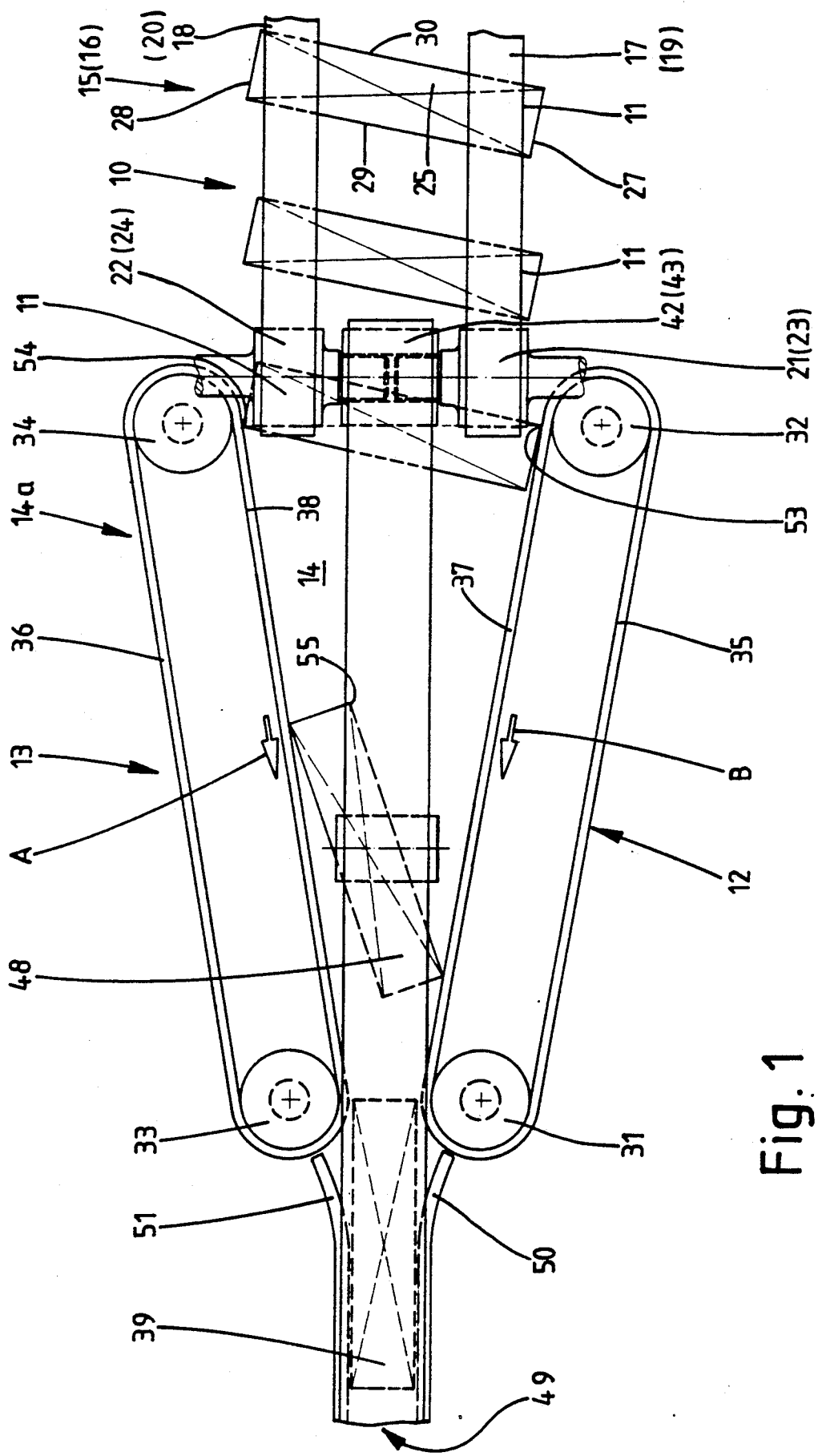
Figure 2:
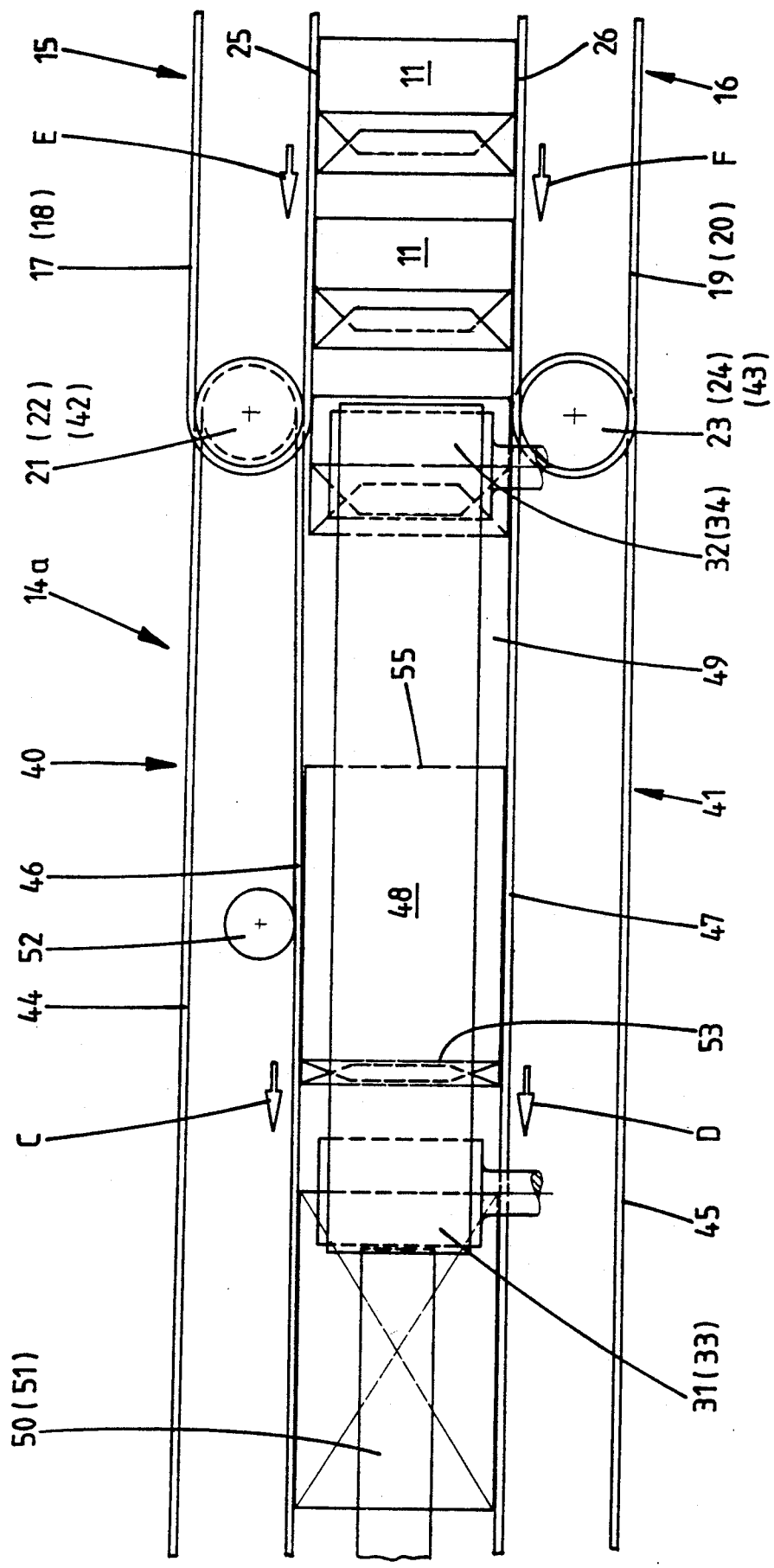
Figure 3:
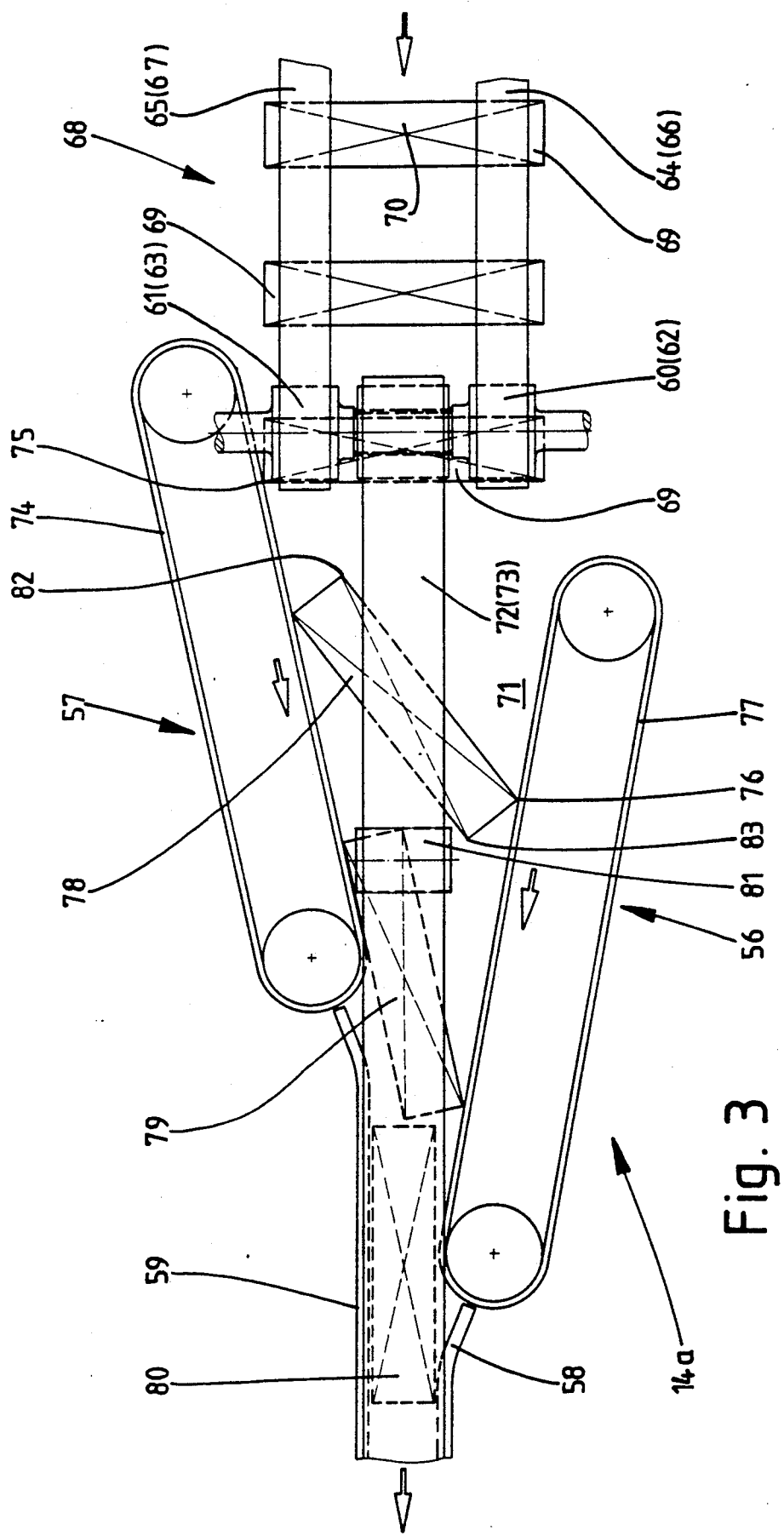

Preferred embodiments of the invention are described in more detail below with reference to the drawings which show:

FIG. 1 a top plan view of a turning station with feed track and a discharge conveyor adjoining the feed track in the region of the turning station;

FIG. 2 a side view of the apparatus according to FIG. 1;

FIG. 3 a top plan view of a further embodiment of the invention with turning conveyors arranged differently to those of FIG. 1.

A feed track 10 delivers packs 11 to a conveying passage 14 formed by two separate conveying means, namely turning conveyors 12, 13 in the region of a turning station 14a. The feed track 10 has two feeder pairs 15, 16 being arranged in parallel planes above one another. Each feeder pair 15, 16 is formed by two conveying belts 17, 18 and 19, 20, respectively. The upper feeder pair 15 is therefore formed by the upper left conveying belt 17 in the conveying direction and the upper right conveying belt 18. Correspondingly, the lower feeder pair 16 is formed by the lower left conveying belt 19 and the lower right conveying belt 20. FIGS. 1 and 2 show that packs 11 are each held between the feeder pairs 15, 16 at four points of support.

A simpler embodiment is only provided with a lower feeder pair, so that the packs just have two points of support.

The conveyor belts 17 to 20 of the feed track 10 are led over deflecting rollers 21. 22 and 23, 24. The deflecting rollers for one feeder pair 15. 16 are axially aligned without being rigidly connected to one another.

The packs 11 are rectangular cigarette packs made of hard cardboard and contact the conveyor belts 17 to 20 with their side walls 25, 26. The end wall 27 and bottom wall 28 of each pack approximately point in a direction transverse to the conveying direction. Front wall 29 points in conveying direction and rear wall 30 in opposite direction of the conveying direction.

The turning conveyors 12, 13 are also designed as conveyor belts 35 and 36 being led over deflecting rollers 31. 32 and 33. 34. A pulling strand 37 or 38 being inside the conveying passage 14 comes to contact a certain portion of the pack 11. The conveyor belts 35, 36 conically taper in conveying direction, such that the conveying passage narrows in the conveying direction (see FIG. 1). The narrowest region of the conveying passage 14 is defined between the deflecting rollers 31 and 33 such that a pack 39 oriented parallel to the conveying direction is just able to pass this narrow region. The entering region into the conveying passage 14 between deflecting rollers 32 and 34 at the end of the feed track 10 is at least as wide as the diagonal line across one of the side walls 25, 26 is long.

For conveying the packs from the feed track 10 further and beyond the region of the conveying passage 14, two approximately parallel discharge conveyors 40, 41 contacting the side walls 25, 26 are provided. These discharge conveyors are also designed as belt conveyors 44. 45 being led over deflecting rollers 42 or 43. An interior strand 46 or 47 of the discharge conveyor 40, 41 comes to contact the side walls 25. 26 of the packs 11. 39. 48. The discharge conveyors thus form a conveying channel 49, in which the packs 11, 39, 48 are conveyed through the conveying passage 14.

The deflecting rollers 42, 43 for the conveyor belts 44, 45 of the discharge conveyors 40, 41 are axially aligned with the deflecting rollers 21, 22 and 23, 24 of the feed track 10, so that the packs 11, 39, 48 can enter the conveying passage 14 coming from the feed track without any vertical displacement or change of direction.

In the region adjoining the end of the conveying passage 14 in conveying direction, the conveying channel 49 is limited by lateral guiding means 50, 51, so that the packs 39 are not displaced by vibrations or the like. The guiding means 50, 51 are slightly warped to the outside (FIG. 1) near the deflecting rollers 30, 33, at the narrowest point of the conveying passage 14, in order to completely avoid the risk of the packs getting jammed. In the region of the upper discharge conveyor 40, there is a pressure means, namely a pressure roller 52, which rests on the strand 46 and thus applies pressure on the upper side wall 25 of each pack.

In the following, the process for changing the relative position of the packs will be described, the arrows A-F indicating the respective moving direction of the belt conveyors 17..20, 35, 36 and 44, 45. The packs 11, being spaced out from one another, are delivered on the feed track 10. The conveyor belts 17 and 19 being arranged on the left hand side in conveying direction run at a velocity of V2, which is higher than the velocity V1 of the conveyor belts 15, 16 arranged on the right hand side. This effects the packs 11, which are oriented transverse to the conveying direction at the beginning of the feed track 10, to be slightly turned at the end of the feed track 10, i e. when entering the conveying passage 14, thus being oriented in oblique position. It is of particular advantage, if the packs enter the conveying passage 14 in a relative position in which the diagonal line across the side walls 25 or 26 is at right angles to the conveying direction, as shown in FIG. 1. This relative position at the beginning of the conveying passage 14 ensures that the effective dimension being transverse to the conveying direction does not increase any more during the turning process but only decreases. The pack 11 then contacts the pulling strand 37 and 38 with a transverse edge 53 and an opposite transverse edge 54, respectively. While the pack 11 is now moved through the conveying passage 14 by the discharge conveyors 40, 41 at a velocity V3, said pack 11 is turned at the same time by the conveyor belts 35. 36 running at different velocities V4 and V5, as these conveyor belts pull the transverse edges 53, 54 relative to the movement of the discharge conveyors 40, 41 with them. In this manner the pack 11 is turned until it is oriented parallel to the conveying direction, just like pack 39 in FIG. 1. The velocity V3 of the conveyor belts 44, 45 of the discharge conveyors 40, 41 is higher than the velocity V2 of the faster conveyor belts 17, 19 of the feed track 10. The velocity V5 of the turning conveyor 13 (being on the right hand side in conveying direction) is smaller than the velocity V3 and the velocity V4 of the turning conveyor 12 (being on the left hand side in conveying direction). V5 is higher than V2 and V4 higher than V3.

If velocity V2 is taken as the base being 100% V1 approximately corresponds to 98%, V3 to 150%, V4 to 200% and V5 to 130%. In absolute terms, with a length of the feed track 10 of 1,000 mm and a pack width of 20 mm effective in conveying direction, the following velocities are particularly advantageous:

$V1 = 49$ m/min $V2 = 50$ m/min $V3 = 77$ m/min $V4 = 100$ m/min $V5 = 65$ m/min Some of the figures given are rounded off. The velocity V3 of the discharge conveyors 40, 41 is chosen to be considerably higher than the velocities V1 and V2 so that the packs 11, 39, 48 are spaced out more on their way through the conveying passage 14. In dependence on the already existing distances between the packs 11 on the feed track 10, this relation of velocities is necessary to avoid the risk of the successive packs wedging during the turning movement. If the packs 11 are already spaced out at sufficient distances on the feed track 10, there is no need for increasing the velocity in the conveying passage 14. FIG. 2 shows that the external diameter of the deflecting roller 42 for the conveyor belt 44 is smaller than the external diameter of the deflecting roller 21 for the conveyor belt 17. For this reason, the packs 11 do not contact the strand 46 with their upper side walls 25 immediately after entering the conveying passage 14. At this stage, the packs only rest on the strand 47 of the lower discharge conveyor and do not receive any counterpressure by the strand 46. This counterpressure does not effect the packs (pack 48 in FIGS. 1 and 2) until they have passed the pressure roller 52 in conveying direction. The pressure roller 52 effects a slight deflection of the strand 46 and at the same time regulates an exact distance between the two strands 46 and 47. The distance between the pressure roller 52 and the strands 31, 33 or 32, 34 is defined such that the pack 48 is not exposed to the pressure of the pressure roller 52, until a transverse edge 55 of the pack 48 which is the last one to pass the pressure roller in conveying direction, is between the strand 46 and the strand 47. This way, the risk of the edge 45 wedging with the strand 46 or 47 is avoided and a reliable turning process ensured.

In a further embodiment not shown in the drawings, the apparatus according to FIGS. 1 and 2 or the apparatus according to FIG. 3 which will be described below, is part of a packaging machine for cigarette packs, such as the one known from DE 34 00 650 A1. This prior art machine produces cuboidal (cigarette) packs from one blank by means of folding and adhesive bonding. In order to set the adhesive, the packs are taken over individually by a first drying turret and then fed to a second drying turret in groups, so that the adhesive can dry or harden completely. In the present embodiment of the invention, this second drying turret is replaced by the apparatus according to FIGS. 1 and 2 or 3. For this purpose, the cross-section of the conveying channel 49 formed by the discharge conveyors 40, 41 and the guiding means 50, 51 is dimensioned such that the packs receive pressure in a form-stabilizing manner, thus ensuring that the desired form of the packs is exactly preserved. Moreover, possible displacements in the region of the adhesive points in the packs can be corrected.

FIG. 3 shows a further embodiment of the apparatus according to the invention. Structure and function of this embodiment correspond to that of FIG. 1 unless it is explicitly stated to the contrary in the following description. In order to improve distinguishability, different reference numerals are used below. In contrast to the symmetrically arranged turning conveyors 12, 13 of FIG. 1, the turning conveyors 56, 57 in this embodiment are offset to one another in conveying direction. Correspondingly, the adjoining guide means 58, 59 are also offset to one another. The turning conveyor 57 being on the right hand side in conveying direction terminates approximately at a distance corresponding to half the length of a turning conveyor before the left-hand turning conveyor 56. Both conveying means 56, 57 are nevertheless of approximately the same length, just like the turning conveyors 12, 13 of FIG. 1.

A further difference is the structure of the feed track. The deflecting rollers 60 to 63 of FIG. 3 corresponding to the deflecting rollers 21 to 24 of FIG. 1 are in contrast to the latter not separately mounted in a rotatable manner. The deflecting rollers 60 and 61 for the conveyor belts 64, 65 contacting the side wall 70 (corresponding to side wall 25) are arranged on a common axis. The same applies to the deflecting rollers 62, 63 of the conveyor belts 66, 67

The turning process of the packs in the embodiment according to FIG. 3 can be described as follows:

Packs 69 delivered on the feed track 68 are spaced out from one another and oriented transverse to the conveying direction. When entering a conveying passage 71 starting at the end of the feed track 68, the packs 69 first of all contact the right hand turning conveyor 57. The packs 69 are led or held by the discharge conveyors 72, 73 bordering on the feed track 68. Due to the difference in velocities of the discharge conveyor 72, 73 and a conveyor belt 74 of the right-hand turning conveyor 57 and due to the transverse pack edge 75 lying ahead in conveying direction contacting the conveyor belt 74, the turning movement of the pack 69 commences. After the pack has turned approx. by 45° another transverse edge 76, which was originally pointing backwards contacts a conveyor belt 77 of the left-hand turning conveyor 56. This conveyor belt 77 runs faster than the discharge conveyors 72, 73 and therefore causes the turning process to continue. The individual phases from this moment until the end of the turning process are illustrated by the packs with reference numerals 78, 79, 80. Pack 78 contacts the conveyor belt 77 first. The effect of the conveyor belt 74 on the turning of the pack ends approximately at the position of pack 79. Pack 80 illustrates a position in which the turning process has already been completed. The embodiment according to FIG. 3 also comprises a pressure means in the form of a pressure roller 81, which takes effect in the region of the upper discharge conveyor 72 on the upper side wall 70 of each pack. Here too, the pressure roller 81 is arranged in the conveying direction such that the transverse edges 82, 83 of the pack 78 which are turning to come inbetween the discharge conveyors 72, 73 can not obstruct the turning process. The relative velocities of the individual conveyor belts approximately correspond to those of the embodiment according to FIG. 1, except that the velocities of the conveyor belts 64 to 67 of the feed track 68 do not differ, since the packs 69 are not partially turned on the feed track 68.

What is claimed is:

1. In a process for changing the relative position of cuboidal packs being successively delivered to a turning station and being turned in the region of said turning station during transport by at least two separate turning conveyors (12, 13) engaging opposite sides of said packs (11) and being driven at different velocities V4 and V5, the improvement comprising delivering the packs (11) to said turning station (14a) in a relative position in which a front and rear wall (29, 30) and an end and bottom wall (27, 28) of each pack are turned about an angle relative to a transverse oriented position so that a diagonal line across a side wall (25, 26) pointing up or down is oriented to the conveying direction.

2. The process according to claim 1, wherein the packs (11) are turned by being pulled at diametrically opposite transverse edges (53, 54), longitudinal edges limiting front, rear and side walls of a pack being oriented from a relative position basically transverse to the conveying direction into a position parallel to the conveying direction.

3. The process according to claim 2, wherein the packs (11) of the hinge-lid type are delivered to said turning station (14a) in a relative position with basically transversely directed upright front and rear walls (29, 30), sideways directed end and bottom walls (27, 28) and with side walls (25, 26) pointing up and downwardly, and wherein said packs (11) are turned in said turning station (14a) such that after leaving the turning station, the upright front and rear wall (29, 30) and the side walls (25, 26) are each oriented parallel to the conveying direction.

4. The process according to claim 3, wherein the packs (11) are accelerated in the region of said turning station (14a) in order to increase their distances to one another in the conveying direction.

5. The process of claim 1 further comprising turning each pack (11) by grasping it at transverse edges (53, 54) thereof which extend from one side wall (25) to the other side wall (26) and which are diametrically opposite to one another.

6. The process according to claim 5, wherein the packs (11), being spaced out from one another, are delivered to said turning station (14a) on a feed track (10), in the process of which they are turned by being pulled by first conveyor belts (19, 20) running at different velocities and contacting at least one pack side and forming a feeder pair, by being pulled by two feeder pairs (15, 16) contacting two opposite side walls (25, 26) of the packs, and wherein said packs are subsequently turned further in the region of the turning station (14a).

7. The process according to claim 6, wherein the packs (11) are transported while being turned and thereafter by two discharge conveyors (40, 41) designed as second conveyor belts (44, 45) engaging the upwardly and downwardly oriented side walls (25, 26), said conveyor belts (44, 45) being driven by a velocity V3 which is higher than the velocity V5 of the slower turning conveyor (13) and lower than the velocity V4 of the faster turning conveyor (12).

8. The process according to claim 7, wherein said second conveyor belts (44, 45) of said discharge conveyors (40, 41) apply a pressure which increases in the conveying direction on the side walls (25, 26) in the region of said turning station (14a).

9. The process according to claim 8, wherein said second conveyor belts (44, 45) of said discharge conveyors (40, 41) apply a form-stabilizing pressure on the packs (11) in a region adjoining the end of the turning station (14a).

10. In an apparatus for changing the relative position of cuboidal packs, in which the packs are successively conveyed to a turning station having a conveying passage defined by two separate turning conveyors (12, 13) which are drivable at different velocities V4 and V5 and by means of which each pack (11) is turnable during conveying by being pulled at opposite pack sides, the improvement wherein the turning conveyors (56, 57) are arranged offset relative to one another in the conveying direction.

11. The apparatus according to claim 10, comprising two discharge conveyors (40, 41), in the form of conveyor belts (44, 45) contacting opposite sides of the packs (11), for conveying the packs (11) at least in the region of said turning station (14a).

12. The apparatus according to claim 11, wherein a conveying channel (49), formed by said discharge conveyors (40, 41) in the region of said turning station (14a) has a cross-section which decreases in the conveying direction.

13. The apparatus according to claim 12, wherein at least one of said discharge conveyors (40, 41), in the form of conveyor belts (44, 45) led over deflecting rollers (42, 43), has a pressure means, taking effect in direction of the other discharge conveyor (40, 41) for decreasing the cross-section in the region of said conveying channel (49).

14. The apparatus according to claim 13, wherein said pressure means is arranged in the conveying direction such that a pressure is applicable on a pack (11), as soon as a transverse edge (55) of the pack (48; 78) passing the pressure means last is within the conveying channel (49) and between the conveyor belts (44, 45) of the discharge conveyors (40, 41).

15. The apparatus according to claim 14, wherein said discharge conveyors (40, 41) extend beyond said turning station (14a), with guiding means (58, 59) adjoining said turning conveyors (12, 13), so that said conveying channel (49) is formed by said discharge conveyor and said guiding means (58, 59) such that said conveying channel (49) is enclosed all-round transverse to the conveying direction.

16. The apparatus according to claim 15, wherein said turning conveyors (12, 13) converge in a conveying direction, thus forming a conveying passage (14).

17. The apparatus according to claim 16, wherein said turning conveyors (12, 13) are spaced out at an end of said conveying passage (14) at a transverse distance corresponding to the dimensions from front to rear walls (29, 30) of a pack (11) pointing with an end wall (28, 27) in the conveying direction and with front and rear walls (29, 30) towards said turning conveyors (12, 13).

18. The apparatus according to claim 11, wherein the packs (11) are feedable to said turning station (14a) via a feed track (10) having two feeder pairs (15, 16) arranged in parallel planes and being formed by two conveyor belts (17, 18; 19, 20) each, opposite side walls (25, 26) of a pack (11) contacting the conveyor belts (17, 18; 19, 20) of a feeder pair (15, 16) and wherein said conveyor belts (17, 18; 19, 20) are led over deflecting rollers (21, 22; 23, 24) which are in alignment with corresponding deflecting rollers (42, 43) for the conveyor belts (44, 45) of the discharge conveyors (40, 41).

19. A process for changing the relative position of packs, especially cuboidal cigarette packs of the hinge-lid type, the packs being successively delivered to a turning station, wherein the packs (11) are turned in the region of said turning station (14a) during transport by at least two separate turning conveyors (12, 13) engaging opposite sides of said packs (11) and being driven by different velocities V4 and V5;

wherein the packs (11) are turned by being pulled at diametrically opposite transverse edges (53, 54), longitudinal edges limiting front, rear and side walls of a pack being oriented from a relative position basically transverse to the conveying direction into a position parallel to the conveying direction;

wherein the packs (11) of the hinge-lid type are delivered to said turning station (14a) in a relative position with basically transversely directed upright front and rear walls (29, 30), sideways directed end and bottom walls (27, 28) and with side walls (25, 26) pointing up- and downwardly, and wherein said packs (11) are turned in said turning station (14a) such that after leaving the turning station, the upright front and rear wall (29, 30) and the side walls (25, 26) are each oriented parallel to the conveying direction;

wherein the packs (11) are delivered to said turning station (14a) in a relative position, in which the front and rear walls (29, 30) and the end and bottom walls (27, 28) are turned about an angle relative to the transverse or sideways oriented position, such that a diagonal line across a side wall (25, 26) pointing up or down is oriented at right angles to the conveying direction;

wherein the packs (11), being spaced out from one another, are delivered to said turning station (14a) on a feed track (10), in the process of which they are turned by being pulled by first conveyor belts (19, 20) running at different velocities and contacting at least one pack side and forming a feeder pair, by being pulled by two feeder pairs (15, 16) contacting two opposite side walls (25, 26) of the packs, and wherein said packs are subsequently turned further in the region of the turning station (14a);

wherein the packs (11) are transported while being turned and thereafter by two discharge conveyors (40, 41) designed as second conveyor belts (44, 45) engaging the upwardly and downwardly oriented side walls (25, 26), said conveyor belts (44, 45) being driven by a velocity V3 which is higher than the velocity V5 of the slower turning conveyor (13) and lower than the velocity V4 of the faster turning conveyor (12); and wherein said second conveyor belts (44, 45) of said discharge conveyors (40, 41) apply a pressure which increases in the conveying direction on the side walls (25, 26) in the region of said turning station (14a).

20. The process according to claim 19, wherein said second conveyor belts (44, 45) of said discharge conveyors (40, 41) apply a form-stabilizing pressure on the packs (11) in a region adjoining the end of the turning station (14a).

21. An apparatus for changing the relative position of packs, especially of cuboidal cigarette packs of the hinge-lid type, in which the packs are successively delivered to a turning station, comprising two separate turning conveyors (12, 13) in the region of the turning station (14a), which are drivable at different velocities V4 and V5 and by means of which said packs (11) are turnable by being pulled at opposite pack sides;

wherein said turning conveyors (12, 13) converge in a conveying direction, thus forming a conveying passage (14);

wherein said turning conveyors (12, 13) are spaced out at an end of said conveying passage (14) at a transverse distance corresponding to the dimensions from front to rear walls (29, 30) of a pack (11) pointing with an end wall (28, 27) in the conveying direction and with front and rear walls (29, 30) towards said turning conveyors (12, 13);

wherein said turning conveyors (12, 13) are spaced apart at the beginning of said conveying passage (14) at a distance corresponding to diagonal lines, of the side walls (25, 26) of a pack (11), extending from one turning conveyor (12) to the other turning conveyor (13), such that said pack (11) is turnable by way of being grasped at transverse edges (53, 54) which extend from one side wall (25) to the other side wall (26) and which are diametrically opposite to one another; and wherein said turning conveyors (56, 57) are arranged offset in conveying direction.

22. In an apparatus for changing the relative position of cuboidal packs, in which the packs are successively conveyed to a turning station having a conveying passage defined by two separate turning conveyors (12, 13) which are drivable at different velocities V4 and V5 and by means of which each pack (11) is turnable during conveying by being pulled at opposite pack sides, the improvement wherein said turning conveyors (12, 13) are spaced apart at the beginning of the conveying passage (14) at a distance corresponding to diagonal lines, of opposite side walls (25, 26) of a pack (11), extending from one turning conveyor (12) to the other turning conveyor (13), such that said pack (11) is turnable by way of being engaged at transverse edges (53, 54) which extend from one side wall (25) to the other side wall (26) and which are diametrically opposite to one another.

* * * * *